US012771702B2

(12) United States Patent
Agrawal et al.

(10) Patent No.: US 12,771,702 B2
(45) Date of Patent: Oct. 20, 2026

(54) IDENTIFYING AND ERADICATING THE SOURCE OF A MALWARE ATTACK

(71) Applicant: Rubrik, Inc., Palo Alto, CA (US)

(72) Inventors: Rohit Agrawal, Santa Clara, CA (US); Mudit Malpani, Sunnyvale, CA (US); Anshul Gupta, Mountain View, CA (US); Gaurav Maheshwari, Bangalore (IN); Siddharth Sharma, Bangalore (IN); Tyler Vu, Sunnyvale, CA (US)

(73) Assignee: Rubrik, Inc., Palo Alto, CA (US)

( * ) Notice: Subject to any disclaimer, the term of this patent is extended or adjusted under 35 U.S.C. 154(b) by 239 days.

(21) Appl. No.: 18/174,364

(22) Filed: Feb. 24, 2023

(65) Prior Publication Data

US 2024/0291836 A1 Aug. 29, 2024

(51) Int. Cl.
*H04L 29/06* (2006.01)
*H04L 9/40* (2022.01)

(52) U.S. Cl.
CPC ................................ *H04L 63/1425* (2013.01)

(58) Field of Classification Search
CPC ............ H04L 63/1425; H04L 63/1416; H04L 63/1433; H04L 63/145; G06F 21/552; G06F 21/554
See application file for complete search history.

(56) References Cited

U.S. PATENT DOCUMENTS 11,973,791 B1 * 4/2024 Li ........................... G06N 5/02
2020/0162485 A1 * 5/2020 Jevans ............... H04L 63/0428
2023/0289604 A1 * 9/2023 Chan ..................... G06F 21/577
2023/0328094 A1 * 10/2023 Brown ................. G06F 21/552 726/23
2023/0344860 A1 * 10/2023 Agranonik ........... G06F 21/561

* cited by examiner

*Primary Examiner* — Amir Mehrmanesh
*Assistant Examiner* — Chi D Nguy
(74) *Attorney, Agent, or Firm* — Holland & Hart LLP

(57) ABSTRACT

Methods, systems, and devices for data management are described. A system supporting malware detection may obtain event data such as risk scores corresponding to events associated with a set of computing entities. Using the event data, the system may construct a graph that includes nodes that represent the set of computing entities, and edges that represent the events, where the edges are between initiator and affected nodes and are associated with the respective event risk scores. Using the graph, respective node risk scores may be calculated for at least some nodes of the graph, and one or more anomalous nodes may be identified based on the one or more anomalous nodes having respective node risk scores that satisfy a threshold. The system may then output an indication of one or more computing entities corresponding to the one or more anomalous nodes.

19 Claims, 9 Drawing Sheets

900

IDENTIFYING AND ERADICATING THE SOURCE OF A MALWARE ATTACK

FIELD OF TECHNOLOGY

The present disclosure relates generally to data management, including techniques for identifying and eradicating the source of a malware attack.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
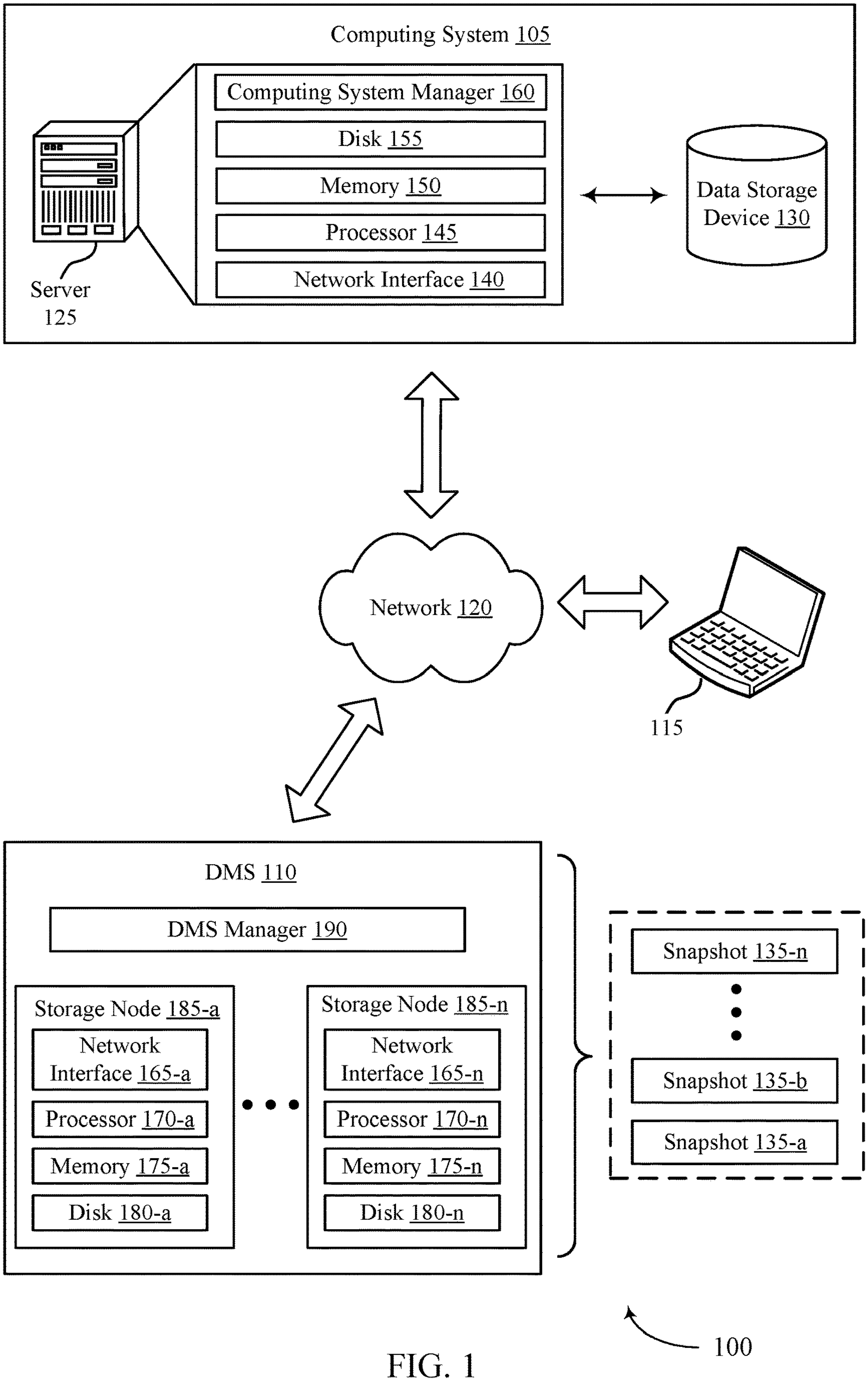
FIG. 1 illustrates an example of a computing environment that supports identifying and eradicating the source of a malware attack in accordance with aspects of the present disclosure.

Some computing systems include a relatively large number of connected computing devices, nodes, servers, or other devices, that are in communication with one another as part of an integrated network. While such large-scale interconnections between computing devices may beneficially support efficient communication and data storage, a highly connected system may also be at risk for malware infection when one or more of the devices become infected with malware. For example, one computing device may become infected with malware, which then may spread to one or more other connected devices. Then, the one or more other connected devices may spread the malware to one or more additional connected devices, and so on, until a significant number of devices in the network are infected. Once infected, for example, the malware may install ransomware to encrypt data on one or more of the infected devices.

Some recovery methods may be able to identify the malware infection on devices where some sort of activity has already been initiated by the malware (e.g., where ransomware has already encrypted data), and mitigate the infection by restoring the device to a pre-activation state (e.g., a state from prior to the activation of the malware). Such recovery methods may, however, be unable to identify the root cause of the infection, and may further be unable to identify devices that are infected with malware but for which the malware has not yet activated (e.g., for which the ransomware has not yet encrypted any data). Without identifying the source of the malware attack, latent malware may remain on an infected device which may later become active, may infect other devices, and may re-infect previously restored devices, thus putting the system at risk.

As described herein, computing system may implement various techniques to identify all computing devices that include malware, even if the malware hasn't yet manifested itself. Such techniques may also be used to target the root cause of the infection by identifying the source of the attack. In a first step, the system may perform event collection to identify various events that occur in the system, and to collect data regarding these events. For example, data relating to the event initiator, affected entities, event type, and a risk score associated with each event are calculated. Once the system collects event information, the system creates one or more directed acyclic graphs (DAGs) which show the interactions between nodes and their associated risk scores. Specifically, there are directed edges from an event initiator to affected entities, so that the DAG may show how different nodes are connected to one another in the system and what interactions have occurred between them.

After creating the one or more DAGs, the system may prune the DAG to remove non-anomalous nodes or events from the DAG. For example, the system may use an anomaly detection algorithm and the associated risk scores of each node to identify which nodes or events are above a certain risk threshold. This process may also be used to identify all the effected high risk entities and the source of the attack. Once the source of the attack and each infected device is identified, the system may output to a user potential action items to eradicate the ransomware. For example, some nodes may be recommended for deletion or password reset.

The techniques described herein may be implemented to realize one or more possible advantages. For example, the techniques described herein may beneficially allow the system to identify the root source of a ransomware attack, and to identify each affected node, even if malware at an affected node remains latent (e.g., data has not yet been encrypted by ransomware at the node). This may allow a user to obtain a more accurate and complete picture of the spread of malware and may provide a more thorough solution for eradicating such malware and sanitizing a networked computing system.

FIG. 1 illustrates an example of a computing environment 100 that supports identifying and eradicating the source of a malware attack in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 (e.g., network interface 165-*a*, network interface 165-*n*) may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 (such as a processor 170-*a* or a processor 170-*n*) may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 (e.g., memory 175-*a*, memory 175-*n*) and disks 180 (e.g., disk 180-*a*, disk 180-*n*) may comprise hardware storage devices. Collectively, the storage nodes 185 (e.g., storage node 185-*a*, storage node 185-*n*) may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 such as a snapshot 135-*a*, a snapshot 135-*b*, a snapshot 135-*n*, may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

The computing system 105 may include a relatively large number of connected computing devices 115, nodes, servers, or other devices, that are in communication with one another. Such highly integrated systems, however, may be at risk for widespread malware infection when one or more of the devices become infected with malware. For example, one computing device of the computing system 105 may become infected with malware, which then may spread to one or more other connected device within the system until a significant number of devices in the network are infected. Once infected, for example, the malware may install ransomware to encrypt data on one or more of the infected devices.

The DMS 110 may implement various techniques to identify all computing devices that include malware, even if the malware hasn't yet manifested itself. Such techniques may also be used to target the root cause of the infection by identifying the source of the attack. In a first step, the DMS 110 may perform event collection to identify various events that occur in the system, and to collect data regarding these events. For example, data relating to the event initiator, affected entities, event type, and a risk score associated with each event are calculated. Once the system collects event information, the DMS 110 may create one or more DAGs which show the interactions between nodes and their associated risk scores. Specifically, there are directed edges from an event initiator to affected entities, so that the DAG may show how different nodes are connected to one another in the system and what interactions have occurred between them.

After creating the one or more DAGs, the DMS 110 may prune the DAG to remove non-anomalous nodes or events from the DAG. For example, the system may use an anomaly detection algorithm and the associated risk scores of each node to identify which nodes or events are above a certain risk threshold. This process may also be used to identify all the effected high risk entities and the source of the attack.

Figure 2:
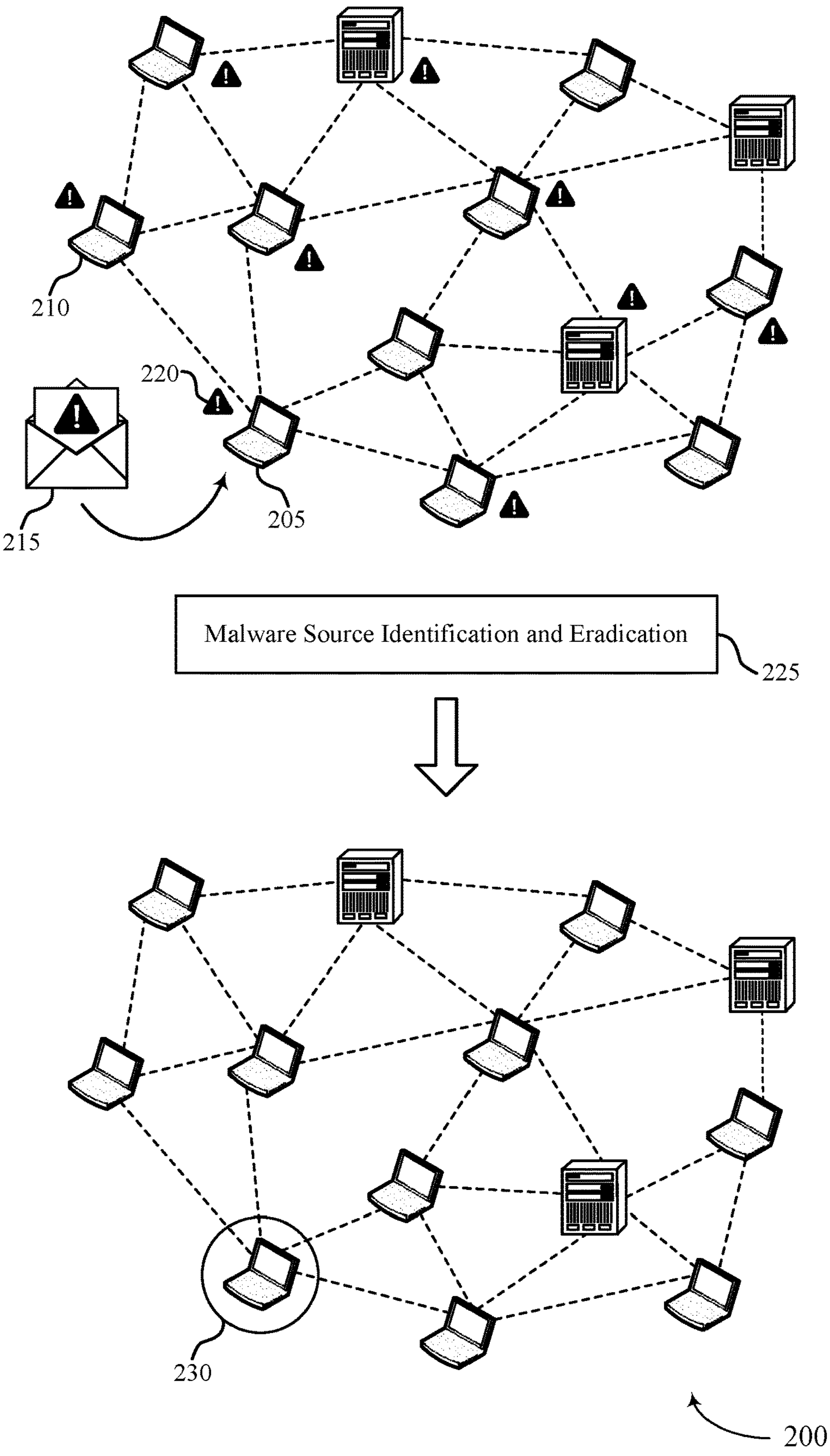
FIG. 2 illustrates an example of a computing system that supports identifying and eradicating the source of a malware attack in accordance with aspects of the present disclosure.

FIG. 2 illustrates an example of a computing system 200 that supports identifying and eradicating the source of a malware attack in accordance with aspects of the present disclosure. For example, computing system 200 may include a quantity of computing devices or nodes, servers, or other devices, that are in communication with one another as part of a network. In some examples, the devices shown in FIG. 2 may be examples of corresponding devices described with reference to FIG. 1.

The computing system 200 may be a connected network, where a relatively large number of computing devices are connected to or otherwise in communication with one another. While such interconnectedness between the devices may support efficient data transfer and storage across devices, it may also make the computing system vulnerable to widespread malware infection. For example, a first computing device 205 may become infected with malware (e.g., via a phishing email 215 or some other malware source), which then may spread to one or more other connected devices 210. Then, the one or more other connected devices 210 may spread the malware to one or more additional connected devices within the system, and so on, until a significant number of devices in the network are infected with the malware 220. Then, once infected, the malware may install ransomware to encrypt data on one or more of the infected devices, which may pose a significant threat to data security.

Some recovery methods may be implemented to identify the malware infection on devices where some sort of activity has already been initiated by the malware (e.g., where ransomware has already encrypted data), and mitigate the infection by restoring the device to a pre-activation state (a state from prior to the activation of the malware). Such recovery methods may, however, be unable to identify the root cause of the infection (e.g., a patient zero among the devices such as the first computing device 205), and may further be unable to identify devices that are infected with malware but for which the malware has not yet activated (e.g., for which the ransomware has not yet encrypted any data).

The computing system 200, therefore, may support various techniques to identify all computing devices that include malware, even if the malware has not yet begun to encrypt data. Such techniques may also be used to target the root cause of the infection by identifying the source of the attack (e.g., the root node or the first infected node), and therefore eradicating the source.

The computing system 200 may implement a malware source identification and eradication procedure 225 to trace and identify the source of the malware attack and to identify potential options for malware eradications. For example, the malware source identification and eradication procedure 225 may include steps of event collection, investigation, and eradication. During an event collection step, the system may identify various events that occur in the computing system 200, and may collect data regarding these events. For example, data relating to the event initiator, affected entities, event type, and a risk score associated with each event are calculated. The event data may be collected from a variety of different sources including sources internal to the system or via third party sources. The event data may include various different data fields including, for example, a data field that includes event imitation information (e.g., an initiator of the event), a data field that includes information regarding entities affected by the event (e.g., the entities that are affected by the initiator of the event), a data field that includes a risk score or an anomalous score corresponding to the event, and a data field that includes information regarding the type of event that occurred. Additionally or alternatively, various other data fields including event data may be possible.

One example of the event may be a file access event for one or more users in the network. For example, a first user (e.g., user1) may be given administrator access to one or more files (e.g., file1 and file2). In this example, the initiator entity is the first user (e.g., user1), and the affected entities would be files accessed by the first user (e.g., file1 and file2). The signal type for this action may be an AddPrivilege signal, and the corresponding risk score associated with action may be assigned. In this example, the event may be assigned a relatively high risk score can be based on the administrator access event type.

After performing the event collection step, an investigation step may then be performed to identify potential anomalies or instances of malware. During the investigation, the system may construct one or more DAGs to show the interactions between nodes and their associated risk scores. Specifically, there are directed edges from an event initiator to affected entities, so that the DAG can show how different nodes are connected to one another in the system and what processes/interactions have occurred between them. The construction of the one or more DAGs is described further with reference to FIG. 3.

After creating the one or more DAGs, the system prunes the DAG to remove non-anomalous nodes or events from the DAG. For example, the system may use an anomaly detection algorithm and the associated risk scores of each node to identify which nodes or events are above a certain risk threshold. This process may also be used to identify all the effected high risk entities, each high risk node, and the source of the attack. For example, the system may identify the risk score associated with the root node 230 (e.g., the source of the attack), which may allow for efficient tracking of the spread of malware in the system.

The system may then perform forward tracking, which may identify anomalous activities that do not have an associated risk score in the DAG. For example, the forward tracking may use the determined node scores to score any nodes that previously lacked scores (e.g., due to the previously collected event data lacking scores for some nodes). Once the source of the attack and each infected device is identified, the system may output to a user potential action items to eradicate the ransomware. In some cases, a blast radius of the attack (e.g., which devices were impacted) may also be determined and indicated to a user. For example, some nodes may be recommended for deletion or password reset. In some examples, the priority of the eradication step may be based on the identified risk score. In such examples, a user with a relatively high risk score may be deleted or the password for the user may be reset. Various other lower priority eradication steps may also be possible. Additionally or alternatively, the output may include options for affected files and systems in order to perform bulk recovery on the computing system 200.

The malware source identification and eradication procedure 225 may beneficially allow for identification of the root source of a ransomware attack, and may support a process for identifying each node that was potentially affected by malware, even if malware at an affected node remains latent (e.g., data has not yet been encrypted by ransomware at the node). This may allow a user to obtain more accurate and complete information regarding the spread of malware, and may provide a more thorough solution for eradicating such malware and restoring the computing system 200.

Figure 3:
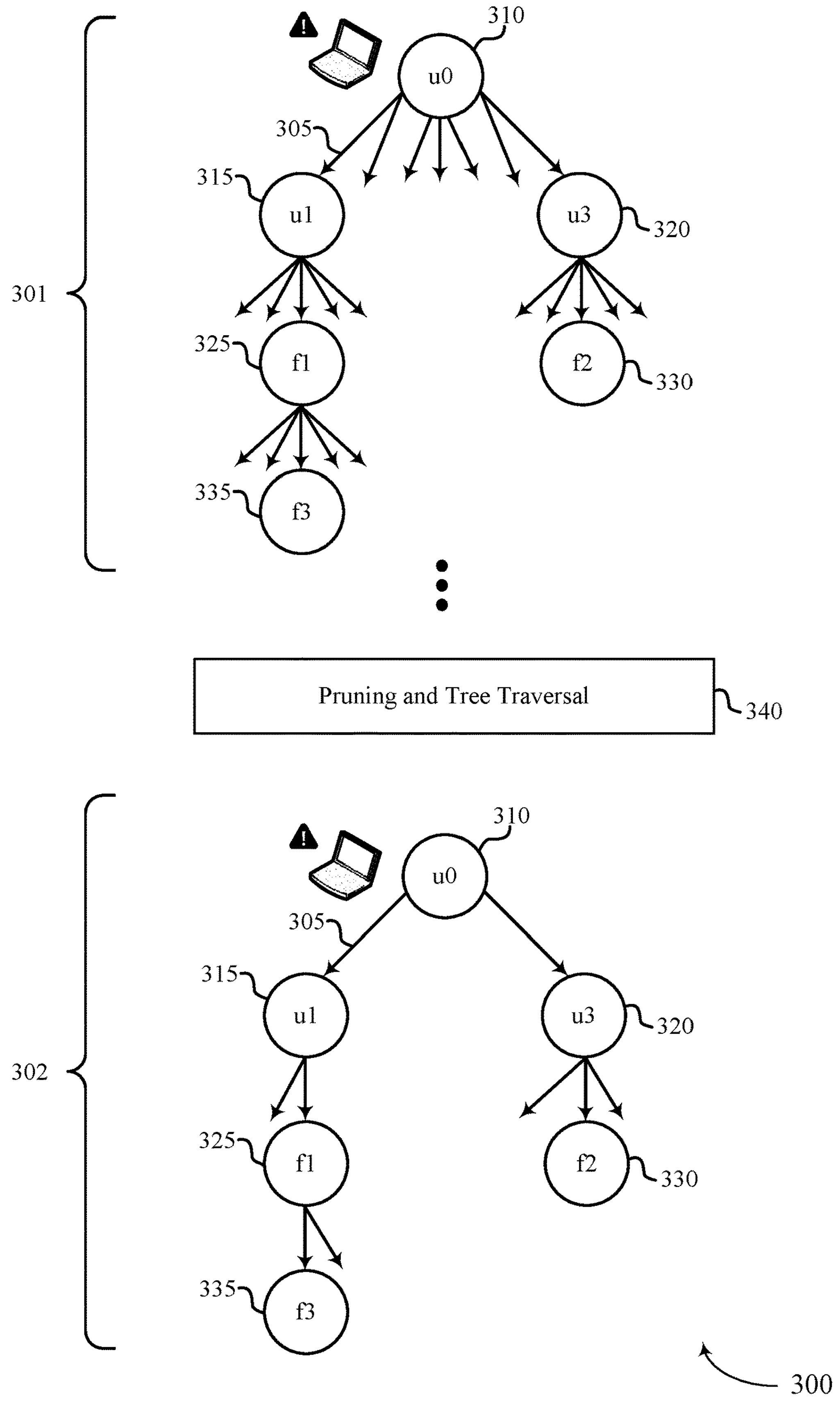
FIG. 3 illustrates an example of a graph construction and traversal procedure that supports identifying and eradicating the source of a malware attack in accordance with aspects of the present disclosure.

FIG. 3 illustrates an example of a graph construction and traversal process 300 that supports identifying and eradicating the source of a malware attack in accordance with aspects of the present disclosure. The graph construction and traversal process 300 may support aspects of the malware source identification and eradication procedure 225 described with reference to FIG. 2. For example, the graph construction and traversal process 300 may be implemented as part of an investigation process included in identifying an initial infection source of malware.

Upon obtaining event data relating to event initiator, affected entities, event type, and a risk score associated with each event, the system may create one or more DAGs to further analyze the events occurring in the system and to identify potential connections and source events associated with the malware infection.

The system may create an event DAG 301 based on the event data or signals corresponding to the events. For example, each event data includes information regarding the initiator of the event, the entities affected by the event, the risk score associated with the event, and event type. In the event DAG 301, there may be one or more directed edges (e.g., such as directed edge 305) from initiator node 310 (*u*0) to the affected entities (e.g., affected node 315 (*u*1) and affected node 320 (*u*3)). The directed edge 305 may represent the event and will be associated with an event type (e.g., eventType) and a corresponding risk score for the event linking the initiator node and the affected node. For example, the event DAG 301 may be constructed by evaluating events that occur between affected nodes, and may be used to identify the source or root node. In some examples, the initiator node 310 (*u*0) may be associated with the affected node 315 (*u*1) and the affected node 320 (*u*3), and may be connected via an edge that represents the event type and corresponding risk scores associated with the events linking the nodes. The DAG 301 may further include events that occur between the affected node 315 (*u*1) and a secondary affected node 325 (*f*1), an event between the secondary affected node 325 (*f*1) and a tertiary affected node 335 (*f*3), and an event between the affected node 320 (*u*3) and the secondary affected node 330 (*f*2). Different types of affected node quantity and affected node configurations may be possible for the DAG 301.

After creating the DAG 301, the system may perform a DAG pruning and tree traversal procedure 340 to obtain additional information regarding the interactions between nodes (and associated computing entities) of the DAG 301. The system may consider each edge from the nodes, and may evaluate an effective risk score for each of the edges based on the risk score of the nodes and the edge itself. The system may then use an anomaly detection algorithm such as an Isolation Forest algorithm, a decision tree algorithm, a machine-learning based algorithm, or any other algorithm, to identify anomalous events. Implementing the algorithm may allow for the identification of the anomalous edges of the DAG 301.

Upon identifying the anomalous edges, the system may prune all of the non-anomalous edges of the DAG 301 to obtain a pruned DAG 302. The system may then identify the risk score of each of the parent nodes based on the remaining edges that were not pruned in the previous step. For example, the risk score of a parent or initiator node (e.g., initiator node 310 (*u*0)) may be calculated using one minus an event risk score (e.g., $1-e_i$) associated with the anomalous edge, where $e_i$ is the risk score of the edges of the pruned DAG 302. Based on the risk factor, a product quantity may be calculated that is equal to a product of each determined respective risk factor (e.g., $\Pi\ (1-e_i)$), and the respective node risk score for the parent node may be determined as equal to one minus the product quantity (e.g., $1-\Pi\ (1-e_i)$). In some examples, this process may be iterative such that the process is repeated for one or more parent nodes until a risk score for the root node (e.g., initiator node 310 (*u*0)) is obtained.

After completing the DAG pruning and tree traversal procedure 340, The system may perform a forward tracking procedure to determine the blast radius of the attack, which may identify anomalous activities that do not have an associated risk score in the DAG. Once the source of the attack and each infected device is identified (e.g., initiator node 310 (*u*0)), the system may output (to a user) potential action items to eradicate the ransomware based on the identified risk scores.

Figure 4:
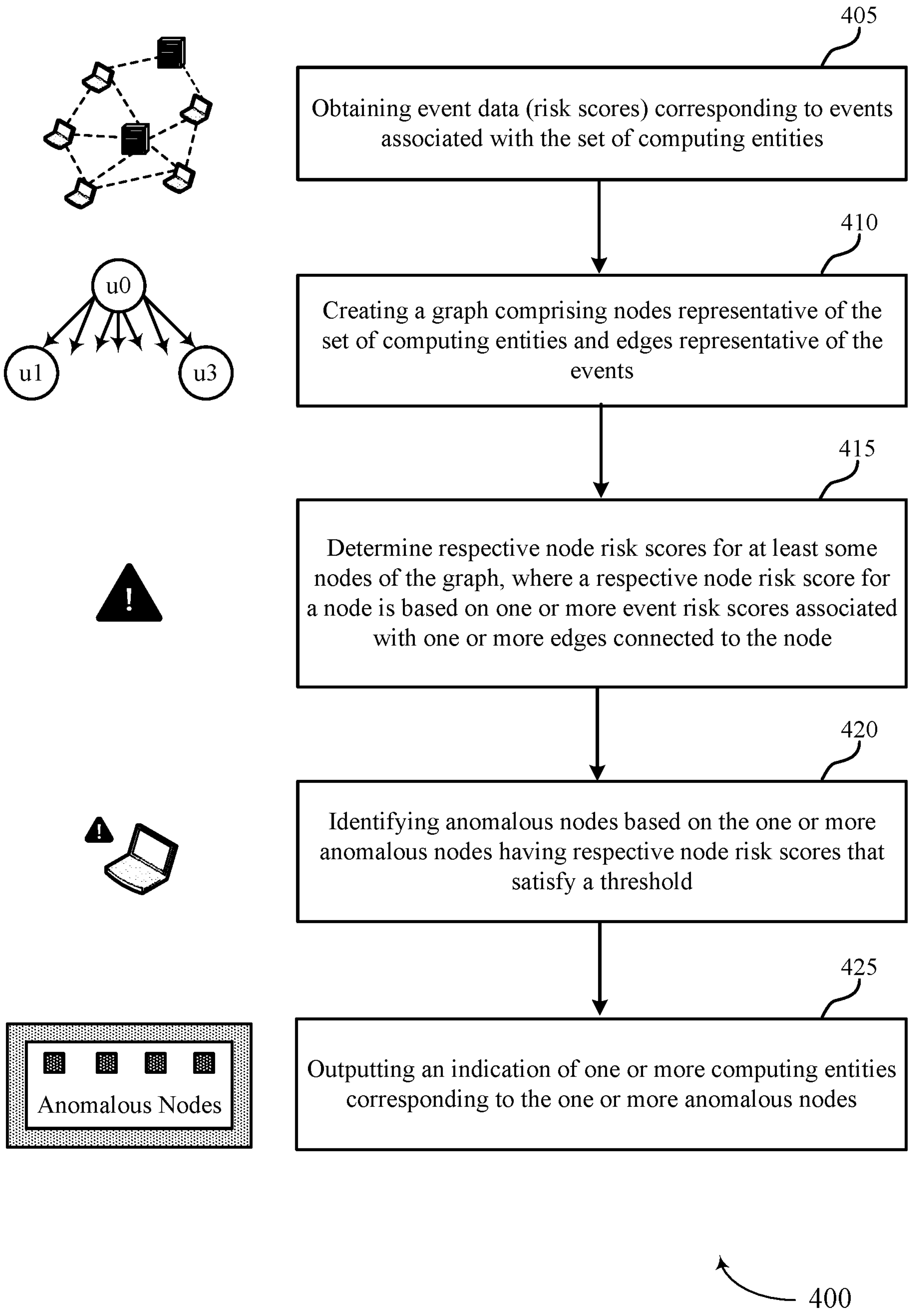
FIG. 4 illustrates an example of a process flow that supports identifying and eradicating the source of a malware attack in accordance with aspects of the present disclosure.

FIG. 4 illustrates an example of a process flow 400 that supports identifying and eradicating the source of a malware attack in accordance with aspects of the present disclosure. The process flow 400 illustrates a process for determining a source of a malware or ransomware attack. In the following description of process flow 400, the operations may be performed in a different order than the order shown, or other operations may be added or removed from the process flow 400. For example, some operations may also be left out of process flow 400, may be performed in different orders or at different times, or other operations may be added to process flow 400. Some aspects of some operations of process flow 400 may be performed at or by one or more computing entities.

At 405, a malware detection process may obtain event data corresponding to events associated with the set of computing entities. The events may be initiated by respective initiator entities within the set of computing entities, and may affect one or more respective affected entities within the set of computing entities. In some examples, the event data includes respective event risk scores for at least some of the events, which indicate a presence of encrypted data or data that is at risk of being encrypted at a computing entity of the set of computing entities. In some examples, the event data includes one or more event data fields including an initiator entity field, an affected entity field, an event risk score field, an event type field, or any combination thereof.

At 410, the malware detection process may include creating, based on the event data, a graph (e.g., a directed acyclic graph) that includes one or more nodes representative of the set of computing entities and edges representative of the events. In some examples, the edges are directed edges between nodes corresponding to the respective initiator entities and the one or more respective affected entities for the events. Additionally or alternatively, at least some of the edges may be associated with the respective event risk scores.

At 415, the malware detection process may determine respective node risk scores for at least some nodes of the graph, where a respective node risk score for a node is based on one or more event risk scores associated with one or more edges connected to the node. In some examples, determining the respective node risk scores for at least some nodes of the graph includes performing one or more iterations of a node-scoring procedure. For example to perform an iteration of the node-scoring procedure, the malware detection process may include determining effective edge risk scores for a set of edges of the graph (e.g., based on node risk scores for child nodes of the set of edges and the respective event risk scores associated with the set of edges), determining whether the set of edges includes one or more anomalous edges (e.g., based on the effective edge risk scores for the set of edges), performing a pruning procedure to remove one or more non-anomalous edges from among the set of edges, and determining if the set of edges includes one or more anomalous edges. In some examples, one or more respective node risk scores for one or more parent nodes of the one or more anomalous edges may be based on the one or more event risk scores associated with the one or more anomalous edges.

In some examples, a first iteration of the malware detection process may include performing a first iteration in which the child nodes of the set of edges are childless nodes within the graph, then performing one or more additional iterations until a root node of the graph is either pruned from the graph or has a respective node risk score determined.

In some examples, determining the respective node risk score for a parent node may include a process of determining a respective risk factor for each anomalous edge connected to the parent node. For example, the risk factor may be equal to one minus an event risk score (e.g., $1-e_i$) associated with the anomalous edge. Based on the risk factor, a product quantity may be calculated that is equal to a product of each determined respective risk factor (e.g., $\Pi\ (1-e_i)$), and the respective node risk score for the parent node may be determined as equal to one minus the product quantity (e.g., $1-\Pi\ (1-e_i)$).

At 420, the malware detection process may identify one or more anomalous nodes based on the one or more anomalous nodes having respective node risk scores that satisfy a threshold. In some examples, the malware detection process may support identifying and eradicating the source of a malware attack using at least one anomaly detection algorithm such as an isolation forest algorithm, a decision tree algorithm, a machine learning-based algorithm, or any combination thereof. In some examples, the malware detection process may identify one of more computing entities as an infection source of the malware attack after a pruned graph is obtained via the one or more iterations of the node-scoring procedure. For example, the infection source may correspond to a root node of the pruned graph.

In some implementations, the malware detection process may further include performing a forward tracking procedure after identifying the one or more anomalous nodes. The forward tracking procedure may include traversing at least a portion of the graph to determine respective node risk scores for one or more previously unscored nodes based on the respective node risk scores for one or more previously scored nodes. Then, based on the forward tracking, the malware detection process may determine a group of computing entities (e.g., a blast radius) affected by the malware attack.

At 425, the malware detection process may output an indication of one or more computing entities corresponding to the one or more anomalous nodes. The indication may in some examples include an indication of one or more procedures to reduce the risk associated with the one or more anomalous nodes. For example, the one or more procedures may include one or more malware eradication procedures including deletion of one or more affected files, replacement of one or more affected files, removal of one or more users associated with the set of computing entities, reset of one or more passwords associated with the set of computing entities, or any combination thereof.

Figure 5:
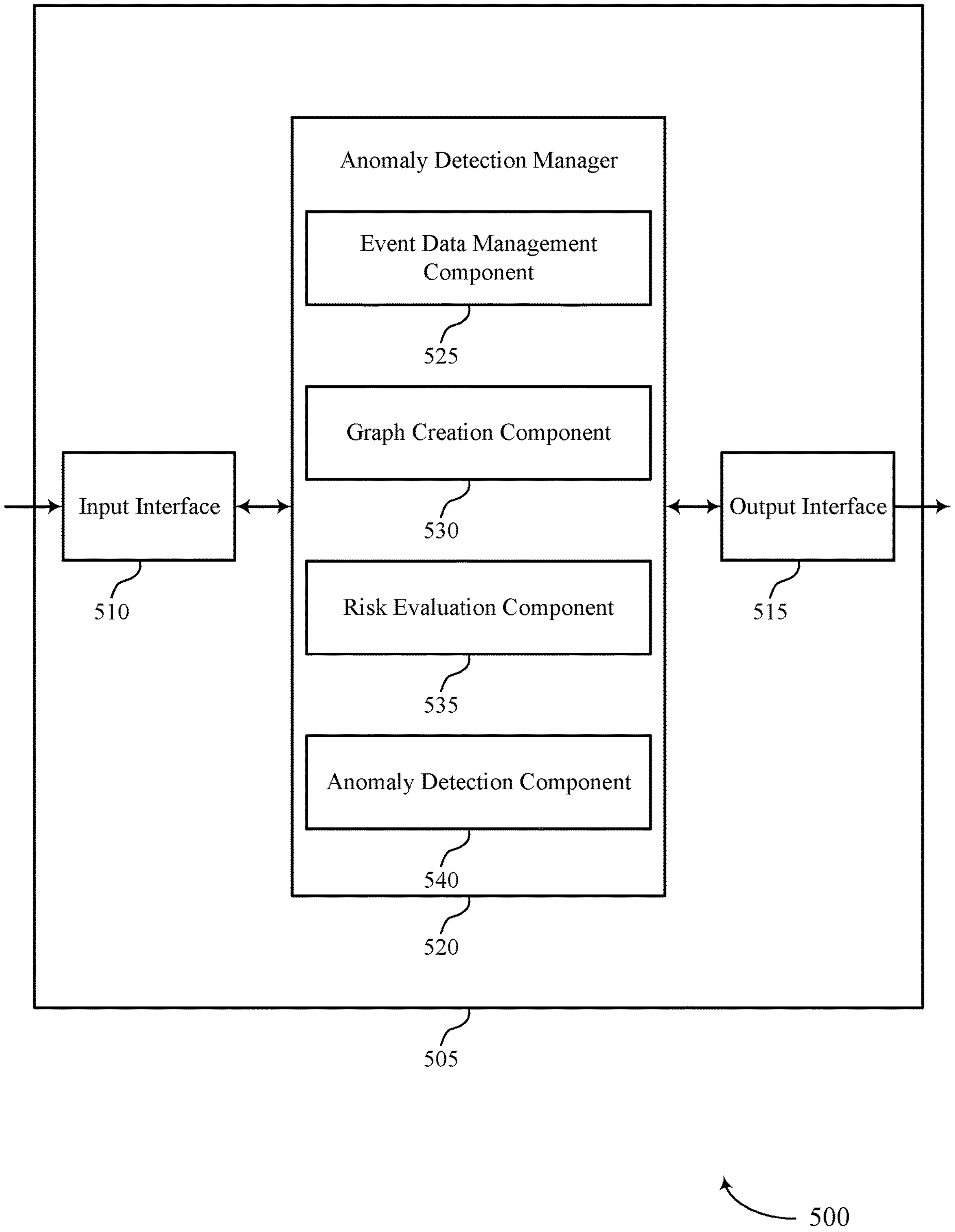
FIG. 5 illustrates a block diagram of an apparatus that supports identifying and eradicating the source of a malware attack in accordance with aspects of the present disclosure.

FIG. 5 illustrates a block diagram 500 of a system 505 that supports identifying and eradicating the source of a malware attack in accordance with aspects of the present disclosure. In some examples, the system 505 may be an example of aspects of one or more components described with reference to FIG. 1, such as a DMS 110. The system 505 may include an input interface 510, an output interface 515, and an anomaly detection manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the anomaly detection manager 520 to support identifying and eradicating the source of a malware attack. In some cases, the input interface 510 may be a component of a network interface 725 as described with reference to FIG. 7.

The output interface 515 may manage output signaling for the system 505. For example, the output interface 515 may receive signaling from other components of the system 505, such as the anomaly detection manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the anomaly detection manager 520 may include an event data management component 525, a graph creation component 530, a risk evaluation component 535, an anomaly detection component 540, or any combination thereof. In some examples, the anomaly detection manager 520, or various components thereof, may be configured to perform various operations (e.g., receiving, monitoring, transmitting) using or otherwise in cooperation with the input interface 510, the output interface 515, or both. For example, the anomaly detection manager 520 may receive information from the input interface 510, send information to the output interface 515, or be integrated in combination with the input interface 510, the output interface 515, or both to receive information, transmit information, or perform various other operations as described herein.

The anomaly detection manager 520 may support managing a set of computing entities in accordance with examples as disclosed herein. The event data management component 525 may be configured as or otherwise support a means for obtaining event data corresponding to events associated with the set of computing entities, where the events are initiated by respective initiator entities within the set of computing entities and affect one or more respective affected entities within the set of computing entities, and where the event data includes respective event risk scores for at least some of the events. The graph creation component 530 may be configured as or otherwise support a means for creating, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores. The risk evaluation component 535 may be configured as or otherwise support a means for determining respective node risk scores for at least some nodes of the graph, where a respective node risk score for a node is based on one or more event risk scores associated with one or more edges connected to the node. The anomaly detection component 540 may be configured as or otherwise support a means for identifying one or more anomalous nodes based on the one or more anomalous nodes having respective node risk scores that satisfy a threshold. The anomaly detection component 540 may be configured as or otherwise support a means for outputting an indication of one or more computing entities corresponding to the one or more anomalous nodes.

Figure 6:
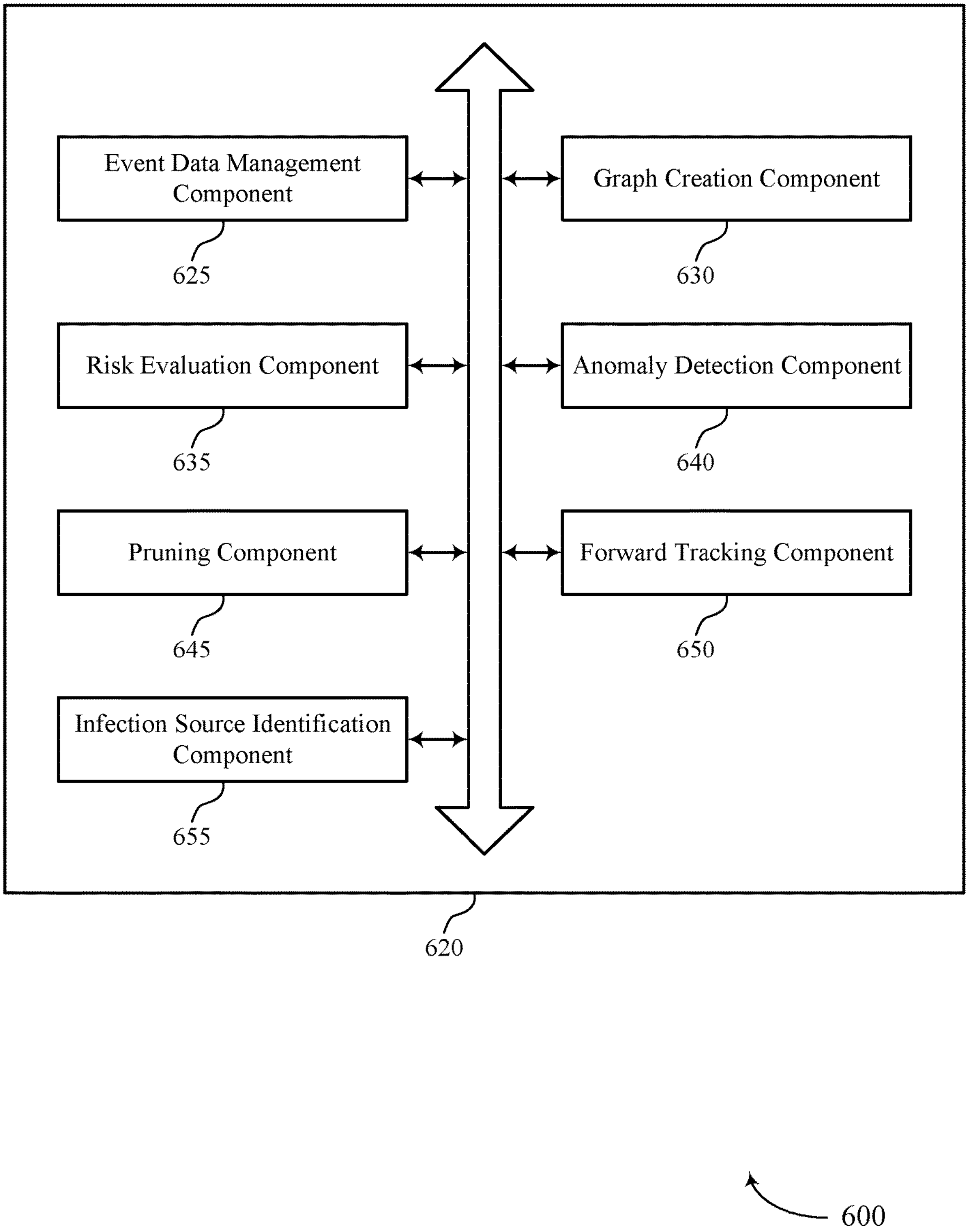
FIG. 6 illustrates a block diagram of an anomaly detection manager that supports identifying and eradicating the source of a malware attack in accordance with aspects of the present disclosure.

FIG. 6 illustrates a block diagram 600 of an anomaly detection manager 620 that supports identifying and eradicating the source of a malware attack in accordance with aspects of the present disclosure. The anomaly detection manager 620 may be an example of aspects of an anomaly detection manager or an anomaly detection manager 520, or both, as described herein. The anomaly detection manager 620, or various components thereof, may be an example of means for performing various aspects of identifying and eradicating the source of a malware attack as described herein. For example, the anomaly detection manager 620 may include an event data management component 625, a graph creation component 630, a risk evaluation component 635, an anomaly detection component 640, a pruning component 645, a forward tracking component 650, an infection source identification component 655, or any combination thereof. Each of these components may communicate, directly or indirectly, with one another (e.g., via one or more buses, communications links, communications interfaces, or any combination thereof).

The anomaly detection manager 620 may support managing a set of computing entities in accordance with examples as disclosed herein. The event data management component 625 may be configured as or otherwise support a means for obtaining event data corresponding to events associated with the set of computing entities, where the events are initiated by respective initiator entities within the set of computing entities and affect one or more respective affected entities within the set of computing entities, and where the event data includes respective event risk scores for at least some of the events. The graph creation component 630 may be configured as or otherwise support a means for creating, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores. The risk evaluation component 635 may be configured as or otherwise support a means for determining respective node risk scores for at least some nodes of the graph, where a respective node risk score for a node is based on one or more event risk scores associated with one or more edges connected to the node. The anomaly detection component 640 may be configured as or otherwise support a means for identifying one or more anomalous nodes based on the one or more anomalous nodes having respective node risk scores that satisfy a threshold. In some examples, the anomaly detection component 640 may be configured as or otherwise support a means for outputting an indication of one or more computing entities corresponding to the one or more anomalous nodes.

In some examples, determining the respective node risk scores for at least some nodes of the graph may include performing one or more iterations of a node-scoring procedure. In some examples, to support performing an iteration of the node-scoring procedure, the risk evaluation component 635 may be configured as or otherwise support a means for determining, for a set of edges of the graph, effective edge risk scores based on node risk scores for child nodes of the set of edges and the respective event risk scores associated with the set of edges. In some examples, to support performing an iteration of the node-scoring procedure, the anomaly detection component 640 may be configured as or otherwise support a means for determining, based on the effective edge risk scores for the set of edges, whether the set of edges includes one or more anomalous edges. In some examples, to support performing an iteration of the node-scoring procedure, the pruning component 645 may be configured as or otherwise support a means for performing a pruning procedure to remove one or more non-anomalous edges from among the set of edges. In some examples, to support performing an iteration of the node-scoring procedure, the risk evaluation component 635 may be configured as or otherwise support a means for determining, if the set of edges includes one or more anomalous edges, one or more respective node risk scores for one or more parent nodes of the one or more anomalous edges based on the one or more event risk scores associated with the one or more anomalous edges.

In some examples, to support performing the one or more iterations of the node-scoring procedure, the pruning component 645 may be configured as or otherwise support a means for performing a first iteration in which the child nodes of the set of edges include childless nodes within the graph. In some examples, to support performing the one or more iterations of the node-scoring procedure, the pruning component 645 may be configured as or otherwise support a means for performing one or more additional iterations until a root node of the graph is either pruned from the graph or has a respective node risk score determined.

In some examples, to support determining the respective node risk score for a parent node of at least one anomalous edge, the risk evaluation component 635 may be configured as or otherwise support a means for determining a respective risk factor for each anomalous edge connected to the parent node, the respective risk factor for an anomalous edge equal to one minus an event risk score associated with the anomalous edge. In some examples, to support determining the respective node risk score for a parent node of at least one anomalous edge, the risk evaluation component 635 may be configured as or otherwise support a means for calculating a product quantity that is equal to a product of each determined respective risk factor. In some examples, to support determining the respective node risk score for a parent node of at least one anomalous edge, the risk evaluation component 635 may be configured as or otherwise support a means for determining the respective node risk score for the parent node as equal to one minus the product quantity.

In some examples, to support determining whether the set of edges includes one or more anomalous edges, the anomaly detection component 640 may be configured as or otherwise support a means for evaluating the set of edges using at least one anomaly detection algorithm.

In some examples, the at least one anomaly detection algorithm includes an isolation forest algorithm, a decision tree algorithm, a machine-learning based algorithm, or any combination thereof.

In some examples, the infection source identification component 655 may be configured as or otherwise support a means for identifying, after a pruned graph is obtained via the one or more iterations of the node-scoring procedure, a computing entity as an infection source of a malware attack based on the computing entity corresponding to a root node of the pruned graph.

In some examples, the forward tracking component 650 may be configured as or otherwise support a means for performing a forward tracking procedure after identifying the one or more anomalous nodes, where the forward tracking procedure includes traversing at least a portion of the graph to determine respective node risk scores for one or more previously unscored nodes based on the respective node risk scores for one or more previously scored nodes. In some examples, the forward tracking component 650 may be configured as or otherwise support a means for determining, based on the forward tracking procedure, from among the set of computing entities, a group of computing entities affected by a malware attack.

In some examples, the group of affected computing entities corresponds to a blast radius of the malware attack.

In some examples, to support outputting the indication of the one or more computing entities corresponding to the one or more anomalous nodes, the anomaly detection component 640 may be configured as or otherwise support a means for outputting an indication of one or more procedures for reducing risk associated with the one or more anomalous nodes.

In some examples, the one or more procedures include one or more malware eradication procedures including deletion of one or more affected files, replacement of one or more affected files, removal of one or more users associated with the set of computing entities, reset of one or more passwords associated with the set of computing entities, or any combination thereof.

In some examples, the respective event risk scores for the events indicate a presence of encrypted data or data that is at risk of being encrypted at a computing entity of the set of computing entities.

In some examples, the event data includes one or more event data fields including an initiator entity field, an affected entity field, an event risk score field, an event type field, or any combination thereof.

In some examples, the graph is a DAG, and the edges of the graph are directed edges.

Figure 7:
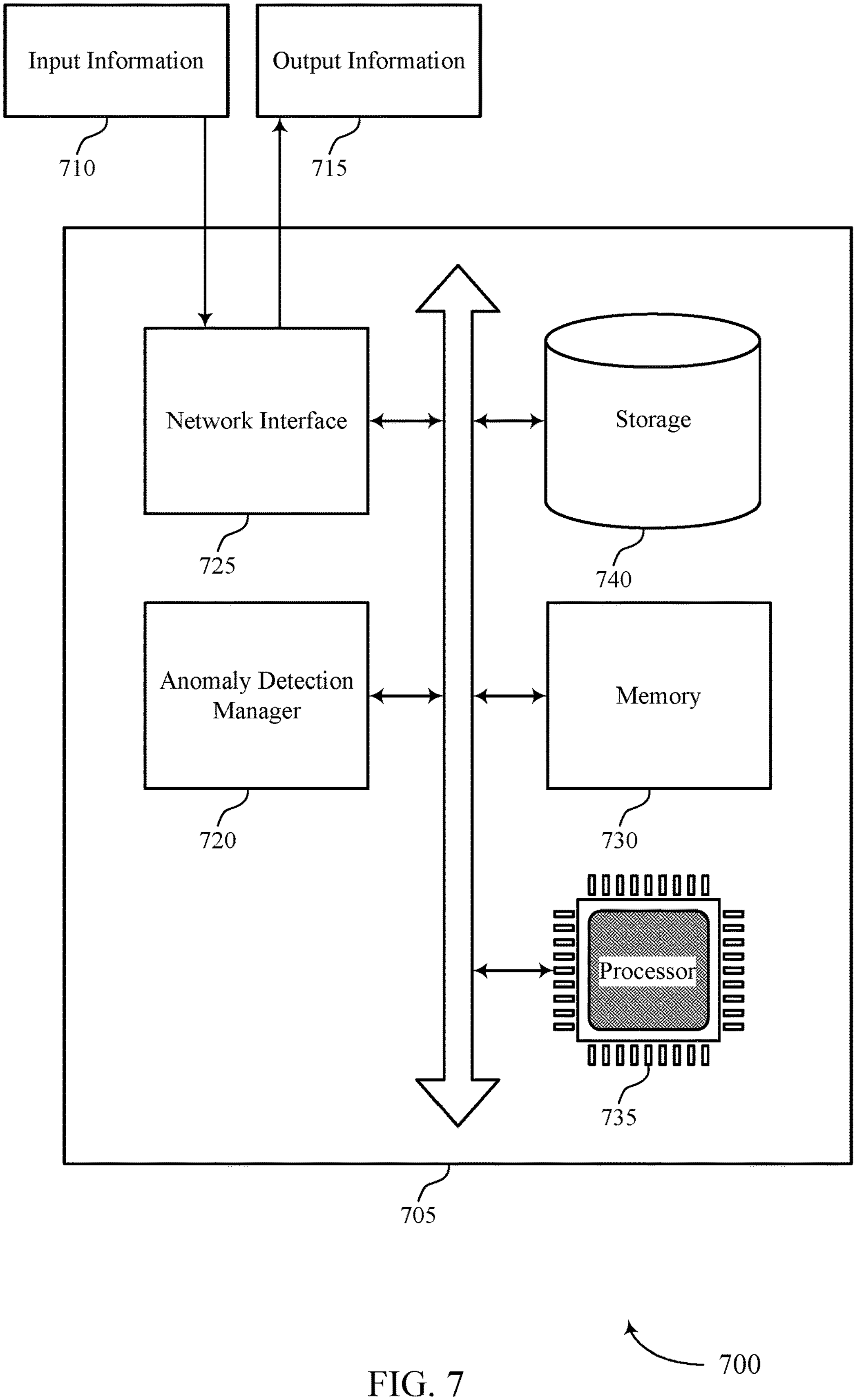
FIG. 7 illustrates a diagram of a system including a device that supports identifying and eradicating the source of a malware attack in accordance with aspects of the present disclosure.

FIG. 7 illustrates a block diagram 700 of a system 705 that supports identifying and eradicating the source of a malware attack in accordance with aspects of the present disclosure. The system 705 may be an example of or include the components of a system 505 as described herein. The system 705 may include components for data management, including components such as an anomaly detection manager 720, an input information 710, an output information 715, a network interface 725, a memory 730, a processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting identifying and eradicating the source of a malware attack). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

The anomaly detection manager 720 may support managing a set of computing entities in accordance with examples as disclosed herein. For example, the anomaly detection manager 720 may be configured as or otherwise support a means for obtaining event data corresponding to events associated with the set of computing entities, where the events are initiated by respective initiator entities within the set of computing entities and affect one or more respective affected entities within the set of computing entities, and where the event data includes respective event risk scores for at least some of the events. The anomaly detection manager 720 may be configured as or otherwise support a means for creating, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores. The anomaly detection manager 720 may be configured as or otherwise support a means for determining respective node risk scores for at least some nodes of the graph, where a respective node risk score for a node is based on one or more event risk scores associated with one or more edges connected to the node. The anomaly detection manager 720 may be configured as or otherwise support a means for identifying one or more anomalous nodes based on the one or more anomalous nodes having respective node risk scores that satisfy a threshold. The anomaly detection manager 720 may be configured as or otherwise support a means for outputting an indication of one or more computing entities corresponding to the one or more anomalous nodes.

By including or configuring the anomaly detection manager 720 in accordance with examples as described herein, the system 705 may support techniques for identifying and eradicating the source of a malware attack, which may provide one or more benefits such as, for example, the techniques described herein may allow for efficient identification of the root source of a ransomware attack, and may support a process for identifying each node that was potentially affected by malware, even if malware at an affected node remains latent (e.g., data has not yet been encrypted by ransomware at the node). This may allow a user to obtain accurate information regarding the spread of malware, and may provide a more thorough solution for eradicating such malware and for global recovery of a computing system, among other possible benefits.

Figure 8:
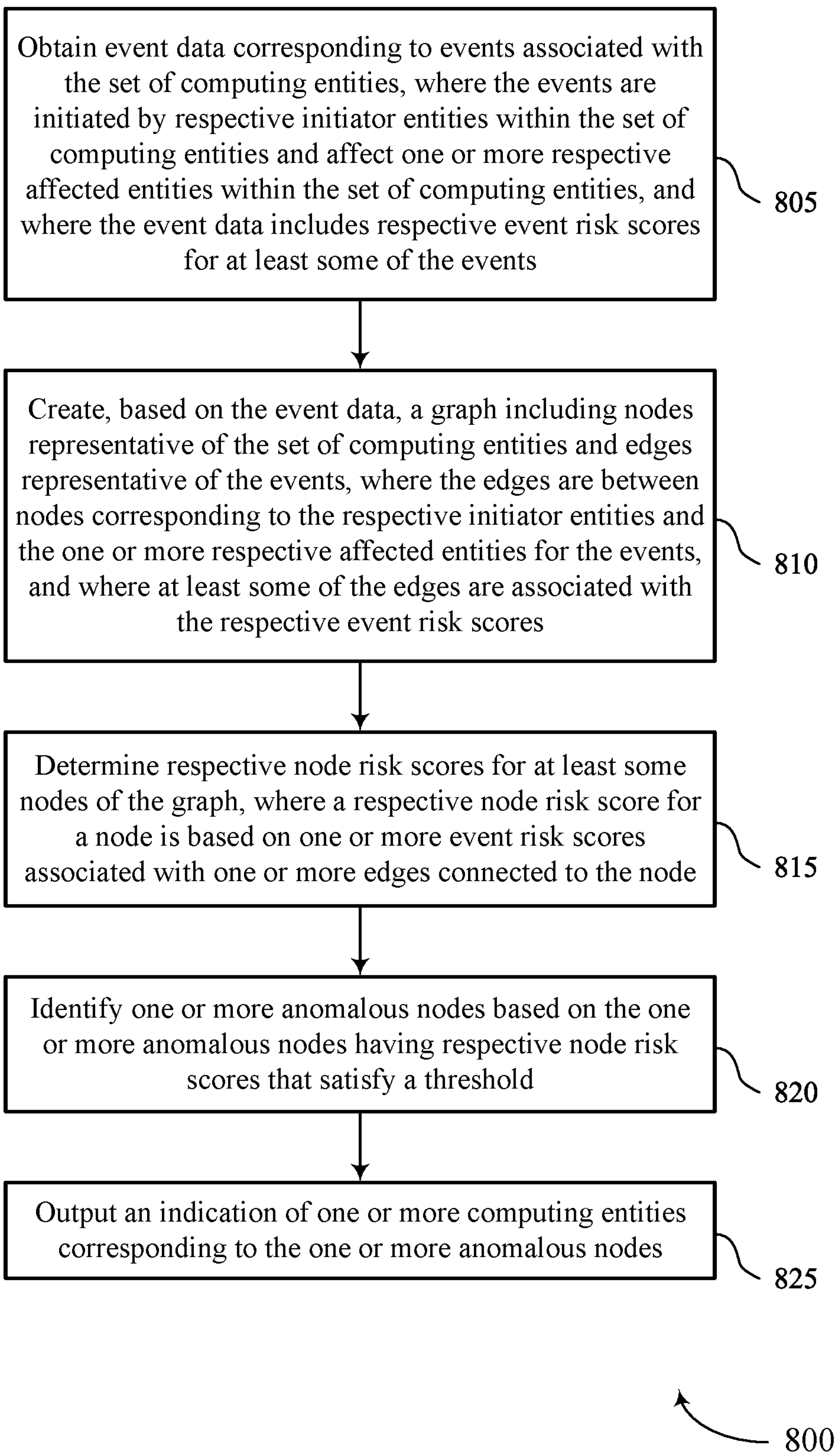
FIGS. 8 and 9 illustrate flowcharts showing methods that support identifying and eradicating the source of a malware attack in accordance with aspects of the present disclosure.

FIG. 8 illustrates a flowchart showing a method 800 that supports identifying and eradicating the source of a malware attack in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include obtaining event data corresponding to events associated with the set of computing entities, where the events are initiated by respective initiator entities within the set of computing entities and affect one or more respective affected entities within the set of computing entities, and where the event data includes respective event risk scores for at least some of the events. The operations of 805 may be performed in accordance with examples as disclosed herein. In some examples, aspects of the operations of 805 may be performed by an event data management component 625 as described with reference to FIG. 6.

At 810, the method may include creating, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores. The operations of 810 may be performed in accordance with examples as disclosed herein. In some examples, aspects of the operations of 810 may be performed by a graph creation component 630 as described with reference to FIG. 6.

At 815, the method may include determining respective node risk scores for at least some nodes of the graph, where a respective node risk score for a node is based on one or more event risk scores associated with one or more edges connected to the node. The operations of 815 may be performed in accordance with examples as disclosed herein.

In some examples, aspects of the operations of 815 may be performed by a risk evaluation component 635 as described with reference to FIG. 6.

At 820, the method may include identifying one or more anomalous nodes based on the one or more anomalous nodes having respective node risk scores that satisfy a threshold. The operations of 820 may be performed in accordance with examples as disclosed herein. In some examples, aspects of the operations of 820 may be performed by an anomaly detection component 640 as described with reference to FIG. 6.

At 825, the method may include outputting an indication of one or more computing entities corresponding to the one or more anomalous nodes. The operations of 825 may be performed in accordance with examples as disclosed herein. In some examples, aspects of the operations of 825 may be performed by an anomaly detection component 640 as described with reference to FIG. 6.

Figure 9:
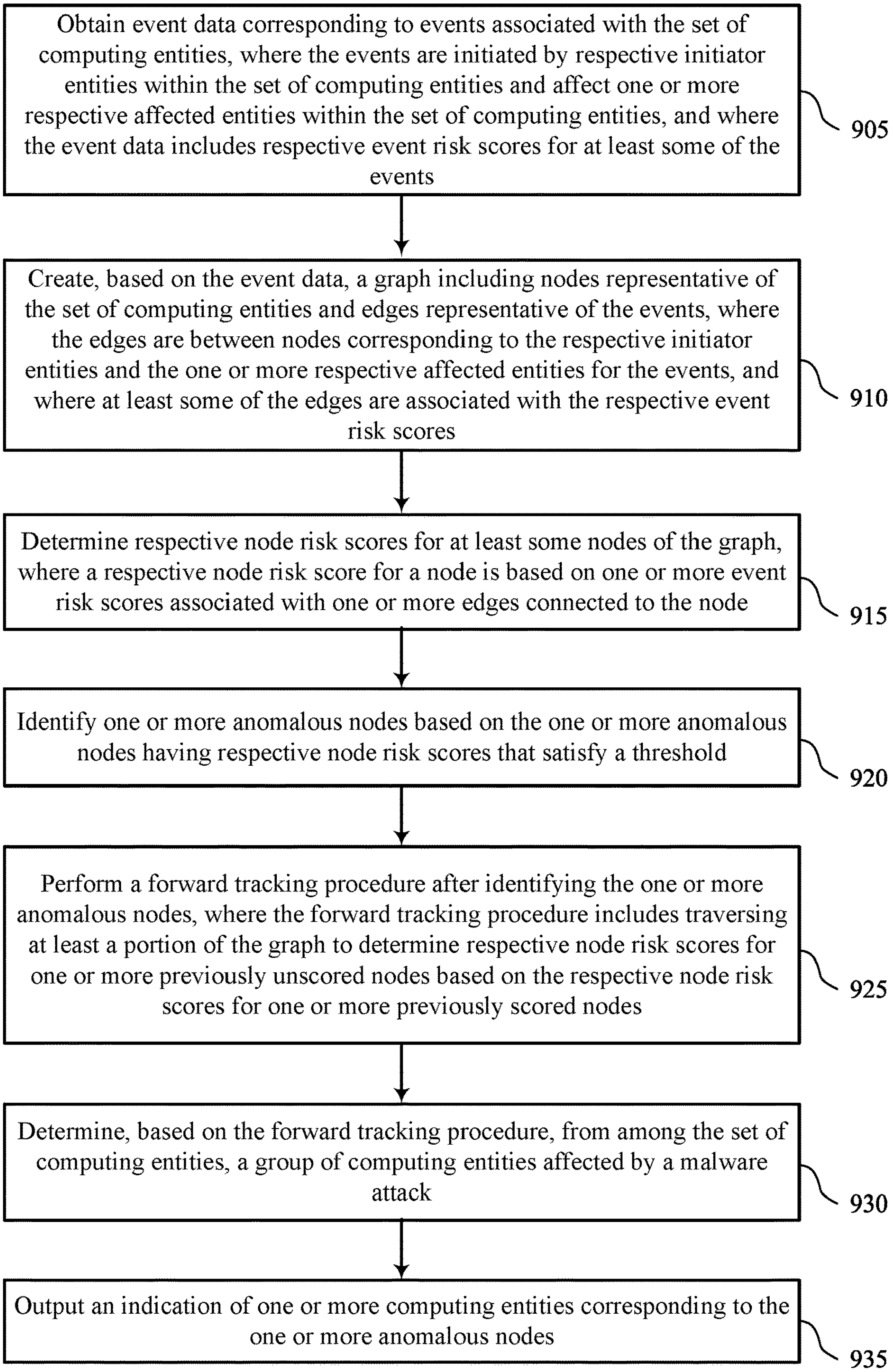

FIG. 9 illustrates a flowchart showing a method 900 that supports identifying and eradicating the source of a malware attack in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include obtaining event data corresponding to events associated with the set of computing entities, where the events are initiated by respective initiator entities within the set of computing entities and affect one or more respective affected entities within the set of computing entities, and where the event data includes respective event risk scores for at least some of the events. The operations of 905 may be performed in accordance with examples as disclosed herein. In some examples, aspects of the operations of 905 may be performed by an event data management component 625 as described with reference to FIG. 6.

At 910, the method may include creating, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores. The operations of 910 may be performed in accordance with examples as disclosed herein. In some examples, aspects of the operations of 910 may be performed by a graph creation component 630 as described with reference to FIG. 6.

At 915, the method may include determining respective node risk scores for at least some nodes of the graph, where a respective node risk score for a node is based on one or more event risk scores associated with one or more edges connected to the node. The operations of 915 may be performed in accordance with examples as disclosed herein. In some examples, aspects of the operations of 915 may be performed by a risk evaluation component 635 as described with reference to FIG. 6.

At 920, the method may include identifying one or more anomalous nodes based on the one or more anomalous nodes having respective node risk scores that satisfy a threshold. The operations of 920 may be performed in accordance with examples as disclosed herein. In some examples, aspects of the operations of 920 may be performed by an anomaly detection component 640 as described with reference to FIG. 6.

At 925, the method may include performing a forward tracking procedure after identifying the one or more anomalous nodes, where the forward tracking procedure includes traversing at least a portion of the graph to determine respective node risk scores for one or more previously unscored nodes based on the respective node risk scores for one or more previously scored nodes. The operations of 925 may be performed in accordance with examples as disclosed herein. In some examples, aspects of the operations of 925 may be performed by a forward tracking component 650 as described with reference to FIG. 6.

At 930, the method may include determining, based on the forward tracking procedure, from among the set of computing entities, a group of computing entities affected by a malware attack. The operations of 930 may be performed in accordance with examples as disclosed herein. In some examples, aspects of the operations of 930 may be performed by a forward tracking component 650 as described with reference to FIG. 6.

At 935, the method may include outputting an indication of one or more computing entities corresponding to the one or more anomalous nodes. The operations of 935 may be performed in accordance with examples as disclosed herein. In some examples, aspects of the operations of 935 may be performed by an anomaly detection component 640 as described with reference to FIG. 6.

A method for managing a set of computing entities is described. The method may include obtaining event data corresponding to events associated with the set of computing entities, where the events are initiated by respective initiator entities within the set of computing entities and affect one or more respective affected entities within the set of computing entities, and where the event data includes respective event risk scores for at least some of the events, creating, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores, determining respective node risk scores for at least some nodes of the graph, where a respective node risk score for a node is based on one or more event risk scores associated with one or more edges connected to the node, identifying one or more anomalous nodes based on the one or more anomalous nodes having respective node risk scores that satisfy a threshold, and outputting an indication of one or more computing entities corresponding to the one or more anomalous nodes.

An apparatus for managing a set of computing entities is described. The apparatus may include one or more processors, memory coupled with the one or more processors, and instructions stored in the memory. The instructions may be executable by the one or more processors to cause the apparatus to obtain event data corresponding to events associated with the set of computing entities, where the events are initiated by respective initiator entities within the set of computing entities and affect one or more respective affected entities within the set of computing entities, and where the event data includes respective event risk scores for at least some of the events, create, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores, determine respective node risk scores for at least some nodes of the graph, where a respective node risk score for a node is based on one or more event risk scores associated with one or more edges connected to the node, identify one or more anomalous nodes based on the one or more anomalous nodes having respective node risk scores that satisfy a threshold, and output an indication of one or more computing entities corresponding to the one or more anomalous nodes.

Another apparatus for managing a set of computing entities is described. The apparatus may include means for obtaining event data corresponding to events associated with the set of computing entities, where the events are initiated by respective initiator entities within the set of computing entities and affect one or more respective affected entities within the set of computing entities, and where the event data includes respective event risk scores for at least some of the events, means for creating, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores, means for determining respective node risk scores for at least some nodes of the graph, where a respective node risk score for a node is based on one or more event risk scores associated with one or more edges connected to the node, means for identifying one or more anomalous nodes based on the one or more anomalous nodes having respective node risk scores that satisfy a threshold, and means for outputting an indication of one or more computing entities corresponding to the one or more anomalous nodes.

A non-transitory computer-readable medium storing code for managing a set of computing entities is described. The code may include instructions executable by one or more processors to obtain event data corresponding to events associated with the set of computing entities, where the events are initiated by respective initiator entities within the set of computing entities and affect one or more respective affected entities within the set of computing entities, and where the event data includes respective event risk scores for at least some of the events, create, based on the event data, a graph including nodes representative of the set of computing entities and edges representative of the events, where the edges are between nodes corresponding to the respective initiator entities and the one or more respective affected entities for the events, and where at least some of the edges are associated with the respective event risk scores, determine respective node risk scores for at least some nodes of the graph, where a respective node risk score for a node is based on one or more event risk scores associated with one or more edges connected to the node, identify one or more anomalous nodes based on the one or more anomalous nodes having respective node risk scores that satisfy a threshold, and output an indication of one or more computing entities corresponding to the one or more anomalous nodes.

In some examples of the method, apparatuses, and non-transitory computer-readable medium described herein, determining the respective node risk scores for at least some nodes of the graph comprises performing one or more iterations of a node-scoring procedure. Operations, features, means, or instructions for performing an iteration of the node-scoring procedure may include operations, features, means, or instructions for determining, for a set of edges of the graph, effective edge risk scores based on node risk scores for child nodes of the set of edges and the respective event risk scores associated with the set of edges, determining, based on the effective edge risk scores for the set of edges, whether the set of edges includes one or more anomalous edges, performing a pruning procedure to remove one or more non-anomalous edges from among the set of edges, and determining, if the set of edges includes one or more anomalous edges, one or more respective node risk scores for one or more parent nodes of the one or more anomalous edges based on the one or more event risk scores associated with the one or more anomalous edges.

In some examples of the method, apparatuses, and non-transitory computer-readable medium described herein, operations, features, means, or instructions for performing the one or more iterations of the node-scoring procedure may include operations, features, means, or instructions for performing a first iteration in which the child nodes of the set of edges include childless nodes within the graph and performing one or more additional iterations until a root node of the graph may be either pruned from the graph or may have a respective node risk score determined.

In some examples of the method, apparatuses, and non-transitory computer-readable medium described herein, operations, features, means, or instructions for determining the respective node risk score for a parent node of at least one anomalous edge may include operations, features, means, or instructions for determining a respective risk factor for each anomalous edge connected to the parent node, the respective risk factor for an anomalous edge equal to one minus an event risk score associated with the anomalous edge, calculating a product quantity that may be equal to a product of each determined respective risk factor, and determining the respective node risk score for the parent node as equal to one minus the product quantity.

In some examples of the method, apparatuses, and non-transitory computer-readable medium described herein, operations, features, means, or instructions for determining whether the set of edges includes one or more anomalous edges may include operations, features, means, or instructions for evaluating the set of edges using at least one anomaly detection algorithm.

In some examples of the method, apparatuses, and non-transitory computer-readable medium described herein, the at least one anomaly detection algorithm includes an isolation forest algorithm, a decision tree algorithm, a machine-learning based algorithm, or any combination thereof.

Some examples of the method, apparatuses, and non-transitory computer-readable medium described herein may further include operations, features, means, or instructions for identifying, after a pruned graph may be obtained via the one or more iterations of the node-scoring procedure, a computing entity as an infection source of a malware attack based on the computing entity corresponding to a root node of the pruned graph.

Some examples of the method, apparatuses, and non-transitory computer-readable medium described herein may further include operations, features, means, or instructions for performing a forward tracking procedure after identifying the one or more anomalous nodes, where the forward tracking procedure includes traversing at least a portion of the graph to determine respective node risk scores for one or more previously unscored nodes based on the respective node risk scores for one or more previously scored nodes and determining, based on the forward tracking procedure, from among the set of computing entities, a group of computing entities affected by a malware attack.

In some examples of the method, apparatuses, and non-transitory computer-readable medium described herein, the group of affected computing entities corresponds to a blast radius of the malware attack.

In some examples of the method, apparatuses, and non-transitory computer-readable medium described herein, operations, features, means, or instructions for outputting the indication of the one or more computing entities corresponding to the one or more anomalous nodes may include operations, features, means, or instructions for outputting an indication of one or more procedures for reducing risk associated with the one or more anomalous nodes.

In some examples of the method, apparatuses, and non-transitory computer-readable medium described herein, the one or more procedures include one or more malware eradication procedures including deletion of one or more affected files, replacement of one or more affected files, removal of one or more users associated with the set of computing entities, reset of one or more passwords associated with the set of computing entities, or any combination thereof.

In some examples of the method, apparatuses, and non-transitory computer-readable medium described herein, the respective event risk scores for the events indicate a presence of encrypted data or data that may be at risk of being encrypted at a computing entity of the set of computing entities.

In some examples of the method, apparatuses, and non-transitory computer-readable medium described herein, the event data includes one or more event data fields including an initiator entity field, an affected entity field, an event risk score field, an event type field, or any combination thereof.

In some examples of the method, apparatuses, and non-transitory computer-readable medium described herein, the graph is a DAG, and the edges of the graph are directed edges.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the one or more processors may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

obtaining event data corresponding to events associated with a set of computing entities, wherein the events are initiated by respective initiator entities within the set of computing entities and affect one or more respective affected entities within the set of computing entities, and wherein the event data comprises respective event risk scores for at least some of the events;

creating, based at least in part on the event data, a graph comprising nodes representative of the set of computing entities and edges representative of the events, wherein the edges are between nodes corresponding to the respective initiator entities and the one or more respective affected entities for the events, and wherein at least some of the edges are associated with the respective event risk scores; and determining respective node risk scores for at least some nodes of the graph, wherein a respective node risk score for a node is based at least in part on one or more event risk scores associated with one or more edges connected to the node, wherein determining the respective node risk scores for at least some nodes of the graph comprises:

pruning one or more non-anomalous edges from the graph to obtain a pruned graph based at least in part on respective edge risk scores for the one or more non-anomalous edges failing to satisfy a risk threshold;

identifying, using the pruned graph, one or more anomalous nodes present in the pruned graph based at least in part on the one or more anomalous nodes having respective node risk scores that satisfy the risk threshold;

performing a forward tracking procedure by traversing at least a portion of the graph to determine respective node risk scores for one or more previously unscored nodes;

determining, based at least in part on the forward tracking procedure, a group of computing entities of the set of computing entities affected by a malware attack that have latent malware, wherein the latent malware comprises malware that is inactive malware present on the group of computing entities; and outputting a first indication of one or more computing entities corresponding to the one or more anomalous nodes and a second indication of the group of computing entities affected by the latent malware.

2. The method of claim 1, wherein determining the respective node risk scores for at least some nodes of the graph comprises performing one or more iterations of a node-scoring procedure, wherein pruning of the one or more non-anomalous edges from the graph results at least in part from the one or more iterations of the node-scoring procedure, and wherein performing an iteration of the node-scoring procedure comprises:

determining, for a set of edges of the graph, effective edge risk scores based at least in part on node risk scores for child nodes of the set of edges and the respective event risk scores associated with the set of edges;

determining, based at least in part on the effective edge risk scores for the set of edges, whether the set of edges includes one or more anomalous edges;

performing a pruning procedure to remove the one or more non-anomalous edges from among the set of edges; and determining, if the set of edges includes the one or more anomalous edges, one or more respective node risk scores for one or more parent nodes of the one or more anomalous edges based at least in part on the one or more event risk scores associated with the one or more anomalous edges.

3. The method of claim 2, wherein performing the one or more iterations of the node-scoring procedure comprises:

performing a first iteration in which the child nodes of the set of edges comprise childless nodes within the graph; and performing one or more additional iterations until a root node of the graph is either pruned from the graph or has a respective node risk score determined.

4. The method of claim 2, wherein determining the respective node risk score for a parent node of at least one anomalous edge comprises:

determining a respective risk factor for each anomalous edge connected to the parent node, the respective risk factor for an anomalous edge equal to one minus an event risk score associated with the anomalous edge;

calculating a product quantity that is equal to a product of each determined respective risk factor; and determining the respective node risk score for the parent node as equal to one minus the product quantity.

5. The method of claim 2, wherein determining whether the set of edges comprises the one or more anomalous edges comprises:

evaluating the set of edges using at least one anomaly detection algorithm.

6. The method of claim 5, wherein the at least one anomaly detection algorithm comprises an isolation forest algorithm, a decision tree algorithm, a machine-learning based algorithm, or any combination thereof.

7. The method of claim 1, further comprising:

identifying, after the pruned graph is obtained via one or more iterations of a node-scoring procedure, a computing entity as an infection source of the malware attack based at least in part on the computing entity corresponding to a root node of the pruned graph.

8. The method of claim 1, wherein the group of computing entities affected by the malware attack corresponds to a blast radius of the malware attack.

9. The method of claim 1, wherein outputting the first indication of the one or more computing entities corresponding to the one or more anomalous nodes comprises:

outputting an indication of one or more procedures for reducing risk associated with the one or more anomalous nodes.

10. The method of claim 9, wherein the one or more procedures comprise one or more malware eradication procedures comprising deletion of one or more affected files, replacement of one or more affected files, removal of one or more users associated with the set of computing entities, reset of one or more passwords associated with the set of computing entities, or any combination thereof.

11. The method of claim 1, wherein the respective event risk scores for the events indicate a presence of encrypted data or data that is at risk of being encrypted at a computing entity of the set of computing entities.

12. The method of claim 1, wherein the event data comprises one or more event data fields including an initiator entity field, an affected entity field, an event risk score field, an event type field, or any combination thereof.

13. The method of claim 1, wherein the graph comprises a directed acyclic graph and the edges of the graph comprise directed edges.

14. An apparatus, comprising:

one or more processors;

one or more memories coupled with the one or more processors; and instructions stored in the one or more memories and executable by the one or more processors to cause the apparatus to:

obtain event data corresponding to events associated with a set of computing entities, wherein the events are initiated by respective initiator entities within the set of computing entities and affect one or more respective affected entities within the set of computing entities, and wherein the event data comprises respective event risk scores for at least some of the events;

create, based at least in part on the event data, a graph comprising nodes representative of the set of computing entities and edges representative of the events, wherein the edges are between nodes corresponding to the respective initiator entities and the one or more respective affected entities for the events, and wherein at least some of the edges are associated with the respective event risk scores; and determine respective node risk scores for at least some nodes of the graph, wherein a respective node risk score for a node is based at least in part on one or more event risk scores associated with one or more edges connected to the node, wherein, to determine the respective node risk scores for at least some nodes of the graph, the instructions are executable by the one or more processors to cause the apparatus to:

prune one or more non-anomalous edges from the graph to obtain a pruned graph based at least in part on respective edge risk scores for the one or more non-anomalous edges failing to satisfy a risk threshold;

identify, using the pruned graph, one or more anomalous nodes present in the pruned graph based at least in part on the one or more anomalous nodes having respective node risk scores that satisfy the risk threshold;

perform a forward tracking procedure by traversing at least a portion of the graph to determine respective node risk scores for one or more previously unscored nodes;

determine, based at least in part on the forward tracking procedure, a group of computing entities of the set of computing entities affected by a malware attack that have latent malware, wherein the latent malware comprises malware that is inactive malware present on the group of computing entities; and output a first indication of one or more computing entities corresponding to the one or more anomalous nodes and a second indication of the group of computing entities affected by the latent malware.

15. The apparatus of claim 14, wherein:

to determine the respective node risk scores for at least some nodes of the graph, the instructions are executable by the one or more processors to cause the apparatus to perform one or more iterations of a node-scoring procedure, wherein pruning of the one or more non-anomalous edges from the graph results at least in part from the one or more iterations of the node-scoring procedure; and to perform an iteration of the node-scoring procedure, the instructions are executable by the one or more processors to cause the apparatus to:

determine, for a set of edges of the graph, effective edge risk scores based at least in part on node risk scores for child nodes of the set of edges and the respective event risk scores associated with the set of edges;

determine, based at least in part on the effective edge risk scores for the set of edges, whether the set of edges includes one or more anomalous edges;

perform a pruning procedure to remove the one or more non-anomalous edges from among the set of edges; and determine, if the set of edges includes the one or more anomalous edges, one or more respective node risk scores for one or more parent nodes of the one or more anomalous edges based at least in part on the one or more event risk scores associated with the one or more anomalous edges.

16. The apparatus of claim 15, wherein, to perform the one or more iterations of the node-scoring procedure, the instructions are executable by the one or more processors to cause the apparatus to:

perform a first iteration in which the child nodes of the set of edges comprise childless nodes within the graph; and perform one or more additional iterations until a root node of the graph is either pruned from the graph or has a respective node risk score determined.

17. The apparatus of claim 15, wherein, to determine whether the set of edges comprises the one or more anomalous edges, the instructions are executable by the one or more processors to cause the apparatus to:

evaluate the set of edges using at least one anomaly detection algorithm.

18. The apparatus of claim 14, wherein the instructions are further executable by the one or more processors to cause the apparatus to:

identify, after the pruned graph is obtained via one or more iterations of a node-scoring procedure, a computing entity as an infection source of the malware attack based at least in part on the computing entity corresponding to a root node of the pruned graph.

19. A non-transitory computer-readable medium storing code, the code comprising instructions executable by one or more processors to:

obtain event data corresponding to events associated with a set of computing entities, wherein the events are initiated by respective initiator entities within the set of computing entities and affect one or more respective affected entities within the set of computing entities, and wherein the event data comprises respective event risk scores for at least some of the events;

create, based at least in part on the event data, a graph comprising nodes representative of the set of computing entities and edges representative of the events, wherein the edges are between nodes corresponding to the respective initiator entities and the one or more respective affected entities for the events, and wherein at least some of the edges are associated with the respective event risk scores; and determine respective node risk scores for at least some nodes of the graph, wherein a respective node risk score for a node is based at least in part on one or more event risk scores associated with one or more edges connected to the node, wherein, to determine the respective node risk scores for at least some nodes of the graph, the instructions are executable by one or more processors to:

prune one or more non-anomalous edges from the graph to obtain a pruned graph based at least in part on respective edge risk scores for the one or more non-anomalous edges failing to satisfy a risk threshold;

identify, using the pruned graph, one or more anomalous nodes present in the pruned graph based at least in part on the one or more anomalous nodes having respective node risk scores that satisfy the risk threshold;

perform a forward tracking procedure by traversing at least a portion of the graph to determine respective node risk scores for one or more previously unscored nodes;

determine, based at least in part on the forward tracking procedure, a group of computing entities of the set of computing entities affected by a malware attack that have latent malware, wherein the latent malware comprises malware that is inactive malware present on the group of computing entities; and output a first indication of one or more computing entities corresponding to the one or more anomalous nodes and a second indication of the group of computing entities affected by the latent malware.

* * * * *